(12) United States Patent
Becu et al.

(10) Patent No.: US 11,366,338 B2
(45) Date of Patent: Jun. 21, 2022

(54) METHOD FOR DETERMINING AN OPTICAL SYSTEM, AND OPHTHALMIC LENS AND OPHTHALMIC FILTER DETERMINED BY SAID METHOD

(71) Applicant: Essilor International, Charenton-le-Pont (FR)

(72) Inventors: Marcia Becu, Paris (FR); Angelo Arleo, Paris (FR); Anne-Catherine Scherlen, Charenton-le-Pont (FR); Delphine Tranvouez-Bernardin, Charenton-le-Pont (FR); Konogan Baranton, Charenton-le-Pont (FR); Denis Sheynikhovich, Paris (FR); Guillaume Tatur, Paris (FR)

(73) Assignee: Essilor International, Charenton-le-Pont (FR)

( * ) Notice: Subject to any disclaimer, the term of this patent is extended or adjusted under 35 U.S.C. 154(b) by 236 days.

(21) Appl. No.: 16/635,927

(22) PCT Filed: Jul. 25, 2018

(86) PCT No.: PCT/EP2018/070196
§ 371 (c)(1),
(2) Date: Jan. 31, 2020

(87) PCT Pub. No.: WO2019/025264
PCT Pub. Date: Feb. 7, 2019

(65) Prior Publication Data
US 2020/0233234 A1    Jul. 23, 2020

(30) Foreign Application Priority Data
Aug. 4, 2017 (EP) .................................. 17306047

(51) Int. Cl.
*G02C 7/02* (2006.01)
*G02C 7/06* (2006.01)
(Continued)

(52) U.S. Cl.
CPC ............. *G02C 7/024* (2013.01); *G02C 7/022* (2013.01); *G02C 7/025* (2013.01); *G02C 7/027* (2013.01);
(Continued)

(58) Field of Classification Search
CPC ........ G02C 7/024; G02C 7/025; G02C 7/022; G02C 7/027; G02C 7/061; G02C 7/10;
(Continued)

(56) References Cited

U.S. PATENT DOCUMENTS

| 8,783,872 B2 | 7/2014 | Giraudet |
| 2012/0019776 A1* | 1/2012 | Giraudet .............. A61B 3/1015 351/204 |

(Continued)

FOREIGN PATENT DOCUMENTS

| WO | 2010/072840 A1 | 7/2010 |
| WO | 2016/113506 A1 | 7/2016 |

OTHER PUBLICATIONS

Cheng et al., "Is there a geometric module for spatial orientation? Squaring theory and evidence", Psychonomic Bulletin & Review, 2005, pp. 1-23, vol. 12, No. 1.
(Continued)

*Primary Examiner* — Jordan M Schwartz
(74) *Attorney, Agent, or Firm* — Nixon & Vanderhye

(57) ABSTRACT

Disclosed is a method for determining an optical system intended to equip a subject, the method including the steps of: —determining an index of sensitivity indicating, when the subject is placed in an environment including surfaces and/or borders forming globally a geometry of this environ-
(Continued)

ment; and landmarks associated with specific locations within the environment, how the subject relies on the global geometry and/or on the local landmarks of the environment to navigate within the environment; and—determining the optical system based on this index of sensitivity. The invention also relates to an ophthalmic lens and to an ophthalmic filter determined by such method.

16 Claims, 4 Drawing Sheets

(51) Int. Cl.
*G02C 7/10* (2006.01)
*G02C 7/04* (2006.01)
(52) U.S. Cl.
CPC ............. *G02C 7/049* (2013.01); *G02C 7/061* (2013.01); *G02C 7/104* (2013.01)
(58) Field of Classification Search
CPC ...... G02C 7/101; G02C 7/104; A61B 3/0033; A61B 3/0041; A61B 3/113
See application file for complete search history.

(56) References Cited

U.S. PATENT DOCUMENTS

| | | |
|---|---|---|
| 2017/0059886 A1 | 3/2017 | Fayolle et al. |
| 2017/0371179 A1 | 12/2017 | Scherlen et al. |
| 2018/0329024 A1* | 11/2018 | Send ........................ G01S 17/46 |
| 2020/0069248 A1* | 3/2020 | Thompson ............ A61B 3/0041 |
| 2020/0098188 A1* | 3/2020 | Bar-Zeev ................ G06F 3/011 |

OTHER PUBLICATIONS

Hermer et al., "A geometric process for spatial reorientation in young children", Nature, 1994, vol. 370, No. 6484, pp. 57-59.
Hermer et al., "Modularity and development: the case of spatial reorientation", Cognition, 1996, pp. 195-232, vol. 61, No. 3.
Bécu et al., "Age-related changes in spatial learning of a real environment and gray matter integrity: a preliminary voxel-based morphometric study", Neuroscience Workshop Saclay: Neural Circuit and Behavior, 2017, XP055447109, <https://news2017.sciencesconf.org/data/pages/Abstracts_Posters_NeWS2017.pdf>, page 9 only.
International Search Report and Written Opinion, dated Oct. 5, 2018, from corresponding PCT application No. PCT/EP2018/070196.
Gallistel, C. R., "The Organization of Learning", Brand, vol. 3, 1990, only cover page and p. 1 were provided and considered.
Hegarty, M. and Waller, D., "A dissociation between mental rotation and perspective-taking spatial abilities," Intelligence, vol. 32, Iss. 2, pp. 175-191, 2004, DOI: http://doi.org/10.1016/j.intell.2003.12.001.
Newcombe, N. and Ratliff, K., "Explaining the development of spatial reorientation", in "The Emerging Spatial Mind", pp. 53-76, 2007. DOI: http://doi.org/10.1093/acprof:oso/9780195189223.003.0003.
Ratliff, K and Newcombe, N., "Reorienting When Cues Conflict—Evidence for an Adaptive-Combination View" in Psychological Science, 19, 1301-1307, DOI: http://doi.org/10.1111/j.1467-9280.2008.02239.x.

* cited by examiner

Fig.10
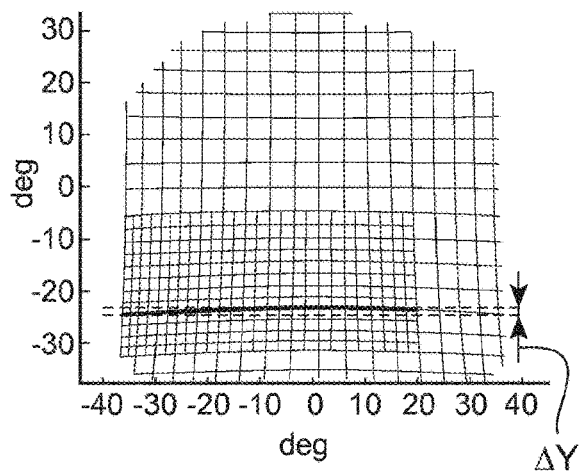
Fig.11
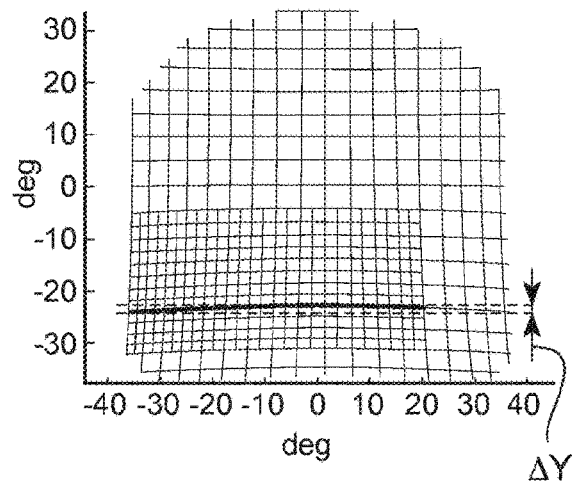
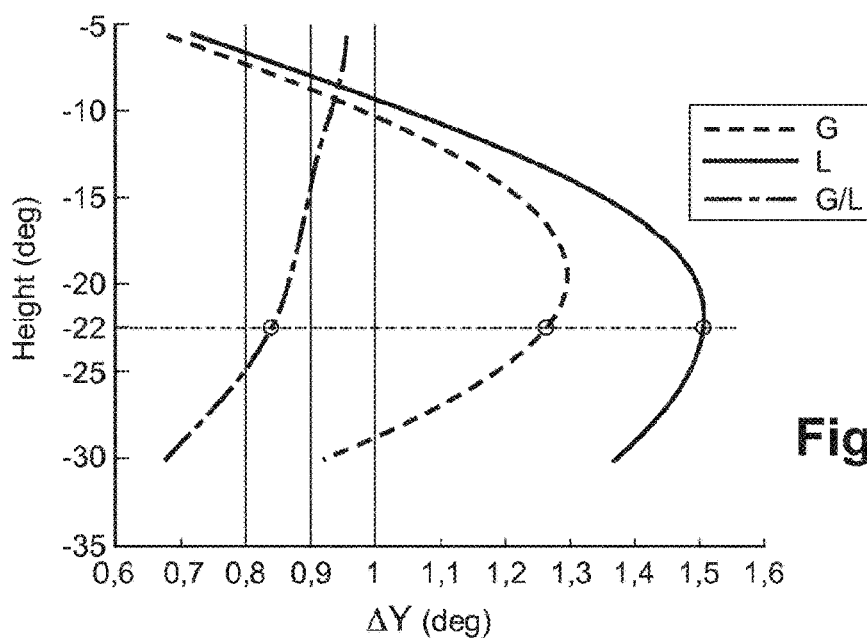
Fig.12
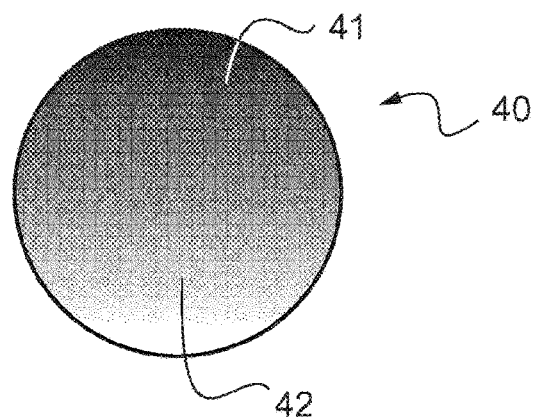
Fig.13

METHOD FOR DETERMINING AN OPTICAL SYSTEM, AND OPHTHALMIC LENS AND OPHTHALMIC FILTER DETERMINED BY SAID METHOD

BACKGROUND OF THE INVENTION

Technical Field of the Invention

The invention relates to the domain of optical equipments.

More precisely the invention relates to a method for determining an optical system intended to equip a subject.

The invention also relates to a method for determining an ophthalmic lens and to an ophthalmic lens determined by such method.

The invention finally relates to a method for determining an ophthalmic filter and to an ophthalmic filter determined by such method.

Background Information and Prior Art

Navigation is the process, for a subject, of determining and maintaining a course or trajectory from one specific place to another (Gallistel, C. R., "The organization of learning", Brand, Vol. 3, 1990).

As the subject is navigating in space, he/she constantly faces with multiple landmarks incorporated in the surrounding environment with varying geometry.

When the subject loses his/her bearings, he/she actively searches for cues that could help him/her retrieve his/her position, heading direction and subsequently the direction that should be taken to reach a particular place (e.g., a goal).

The cue could be either geometric in nature (i.e. "my goal is situated along the right long side of the street") or could be a particular landmark (i.e. "my goal is situated to the left of the baker's shop"), or even a combination of them.

The navigation process can imply the identification of the subject's (a.k.a. navigator) current location and orientation. By exploring a given environment, the subject can gather knowledge about the identity and position of spatial cues that can be memorized and subsequently used to return to a previously visited location (e.g., a goal).

If the subject is already equipped with an optical system like eyeglasses or if he/she is not, it is important to adapt the lens(es) and/or the filter(s) to the specific needs of the subject during a navigation task.

One possibility to adapt the lenses to a wearer in a navigation task can be a direct gaze measurement with an eye tracker. This solution is disclosed in document US 2017/059886. However, this technical solution is tricky and fastidious.

In a given environment, there are two major classes of external spatial cues readily used by a subject during navigation and suitable for orientation and/or navigation.

Generally, the environment includes:
  surfaces, and/or borders, that globally form the geometry of this environment (i.e. geometric features or cues); and
  "landmarks" that are associated with specific locations (e.g., points of interest) within this environment.

On the one hand, the geometric features of the environment provide the subject with metric information such as the lengths and angles of the surfaces or boundaries that form the shape of the environment. For instance, contours of a mountain range or the shoreline, the structure of a room or the sides of a large building are considered as geometric cues.

On the other hand, landmarks are objects or other environmental features that are easily recognizable and associated with a particular spatial location within the environment.

Both geometry (geometric cues) and landmarks are ubiquitous both in natural and artificial (man-made) environments and their exploitation by a subject while navigating in the environment has been studied extensively in animals and humans.

For example, the landmark and geometric cues reliability has been widely studied in children and young adults (K. R. Ratliff and N. S. Newcombe "*Reorienting When Cues Conflict—Evidence for an Adaptive-Combination View*" in Psychological Science, 19, 1301-1307, DOI: http://doi.org/10.1111/i.1467-9280.2008.02239.x; N. S. Newcombe and K. R. Ratliff, "Explaining the development of spatial reorientation", in "The Emerging Spatial Mind", pp. 53-76, 2007. DOI: http://doi.org/10.1093/acprof:oso/9780195189223.003.0003; K. Cheng and N. S. Newcombe, "*Is there a geometric module for spatial orientation? squaring theory and evidence*", in Psychonomic Bulletin & Review, February (2005), 12(1), pp. 1-23, DOI: http://doi.org/10.3758/BF03196346; Hermer and Spelke, "*A geometric process for spatial reorientation in young children*", Nature, 1994; Hermer and Spelke, "*Modularity and development: the case of spatial reorientation*", Cognition, 61(3), 195-232, 1996).

The aforementioned studies have shown that while young children utilize primarily the geometric cues when navigating, young adults focus more heavily on landmarks to orient themselves.

Cues reliability of a subject appears to change with various parameters such as: age, need for visual correction, visual abilities, postural or gait specificities.

This behavioral difference is not taken into account in the current visual equipment of wearers. This may cause discomfort during navigation as well as blur or impair interesting and orienting cues for the subject.

SUMMARY OF THE INVENTION

Therefore one object of the invention is to provide a method to make an optical system adapted to the visual needs of a subject during navigation. This method takes into account the visual strategy of the subject, in particular depending on whether it relies on landmark or geometry cues.

The above object is achieved according to the invention by providing a method for determining an optical system intended to equip a subject, said method comprising the steps of:
  determining an index of sensitivity indicating, when said subject is placed in an environment including:
    surfaces and/or borders forming globally a geometry of said environment; and
    landmarks associated with specific locations within said environment,
  how said subject relies on said global geometry and/or on said local landmarks of the environment to navigate within said environment; and
    determining said optical system as a function of said index of sensitivity.

Preferably, said index of sensitivity indicates whether said subject relies preferably on said global geometry or on said local landmarks of the environment to navigate within said environment.

More preferably, said index of sensitivity is determined in accordance with the probability of said subject to rely preferably on said global geometry or on said local landmarks.

In a particularly advantageous embodiment of the method according to the invention, the step of determination of the index of sensitivity includes the sub-steps of:

placing said subject in conditions for learning to displace in said environment from an initial location towards a goal having respective predetermined positions in a reference frame associated with said environment;

transforming said environment in order to introduce a conflict/an ambiguity between/about the global geometry and the local landmarks of the environment, so as to affect subject's navigation skills;

asking the subject, placed in the transformed environment to reach the goal starting from the same initial position;

determining, from the path taken by the subject to reach the goal, the index of sensitivity of the user.

In a preferred embodiment of the method, the sub-step of transforming the environment comprises making a geometrical transformation to said environment adapted, in said reference frame, to change the positions of the local landmarks without changing neither the position of said goal nor the global geometry of the environment.

Other advantageous and non-limiting features of the method according to the invention include:

the surfaces and/or borders forming the global geometry of the environment presents an apparent size greater than one tenth of the size of the environment; and the local landmarks present an apparent size smaller than one tenth of the environment;

the method further comprises, before the second determination step, a step for assessing at least one oculomotor parameter representative of an oculomotor behavior of said subject related to said index of sensitivity;

said at least one oculomotor parameter is: a fixation time at eye level; a fixation time at ground level; a ratio between one fixation time and the other; an angular distribution of gaze directions; a mean or median direction of gaze; a preferred direction of gaze; a vertical and/or horizontal stability in gaze directions; a vertical and/or horizontal exploration in gaze directions; an ocular velocity.

In a particular embodiment of the method according to the invention, the step of determination of the index of sensitivity includes the sub-steps of:

placing said subject in conditions to virtually or really displace in said environment from an initial location towards a goal having respective predetermined positions in a reference frame associated with said environment, wherein said subject may select between at least two displacements which are possible to reach the goal through a first sub-path or a second sub-path in a couple of alternative sub-paths, the first sub-path being associated to a local landmark whereas the second sub-path is associated to the global geometry of the environment, determining, from the displacement selected by the subject, the index of sensitivity of the user.

Advantageously, the subject may select a displacement between a plurality of displacements, wherein each displacement is formed by a succession of sub-paths, each selected in a couple of sub-paths wherein the first sub-path is associated to a local landmark whereas the second sub-path is associated to the global geometry of the environment.

The method according to the invention may be advantageously implemented for determining an ophthalmic lens, said lens having an upper part and a lower part, wherein the second determination step comprises at least one sub-step among the following:

decreasing a characteristic value of the optical distortion in the lower part of said ophthalmic lens;

decreasing the variation of the optical distortion along a substantially vertical axis;

reducing the addition of the ophthalmic lens;

increasing the size of an area in the upper part of the lens where a residual astigmatism is lower than 0.25 diopters; and/or widening the field of view for far vision conditions.

The invention also provides an ophthalmic lens determined according to the preceding method.

Moreover, the method according to the invention may be advantageously implemented for determining an ophthalmic filter, said filter having an upper part and a lower part, wherein the determination step comprises at least one sub-step among the following:

imparting a first spectral response to said upper part of the filter or imparting a second spectral response to said lower part of the filter; and/or imparting a substantially vertical gradient of luminous transmission between the upper and the lower part of said filter.

The invention also provides an ophthalmic filter determined according to the preceding method.

BRIEF DESCRIPTION OF THE DRAWINGS

The following description, enriched with joint drawings that should be taken as non limitative examples, will help understand the invention and figure out how it can be realized.

On joint drawings:

FIGS. 10 and 11 are the images of a regular grid seen through the G-lens and L-lens of FIGS. 6-9 showing the optical distortion in the vertical direction in the lower part of the lenses;

FIG. 12 represents the peak-to-valley distances $\Delta Y$ of the distorted line to a horizontal straight line (in dash line on FIGS. 10-11) as a function of the height of gaze (in degrees) through the lenses of FIGS. 10 and 11, and the ratio thereof;

FIG. 13 is a schematic example of an ophthalmic filter determined according to a method of the invention for a subject in the "geometry" group.

DETAILED DESCRIPTION OF THE PREFERRED EMBODIMENTS

As mentioned above, the present invention relates to a method for determining an optical system intended to equip a subject, e.g. a pair of ophthalmic lenses or filters worn in front of his/her eyes, said method comprising the steps of:

1) determining an index of sensitivity indicating, when said subject is placed in an environment including:
   surfaces and/or borders forming globally a geometry of said environment; and
   landmarks associated with specific locations within said environment, how said subject relies on said global geometry and/or on said local landmarks of the environment to navigate within said environment; and
2) determining said optical system as a function of said index of sensitivity.

By "how the subject relies on said global geometry and/or on said local landmarks", it is preferably meant here that the index of sensitivity indicates whether the subject relies preferably on said global geometry or on said local landmarks of the environment to navigate within said environment. More preferably, the index of sensitivity is a continuous quantity and is determined in accordance with the actual probability of the subject to rely preferably on said global geometry or on said local landmarks.

Advantageously, the step of determination of the index of sensitivity includes the sub-steps of:

1a) placing said subject in conditions for learning to displace in said environment from an initial location towards a goal having respective predetermined positions in a reference frame associated with said environment;

1b) transforming said environment in order to introduce a conflict/an ambiguity between/about the global geometry and the local landmarks of the environment, so as to affect subject's navigation skills;

1c) asking the subject, placed in the transformed environment to reach the goal starting from the same initial position;

1d) determining, from the path taken by the subject to reach the goal, the index of sensitivity of the subject.

In the preferred embodiment of the method of determination described hereinafter, the sub-step 1b) of transformation comprises making a geometrical transformation to said environment adapted, in said reference frame, to change the positions of the local landmarks without changing neither the position of said goal nor the global geometry of the environment;

Index of Sensitivity

We will hereafter give some details about the way of determination of this index of sensitivity.

Experimental Setup

Figure 1:
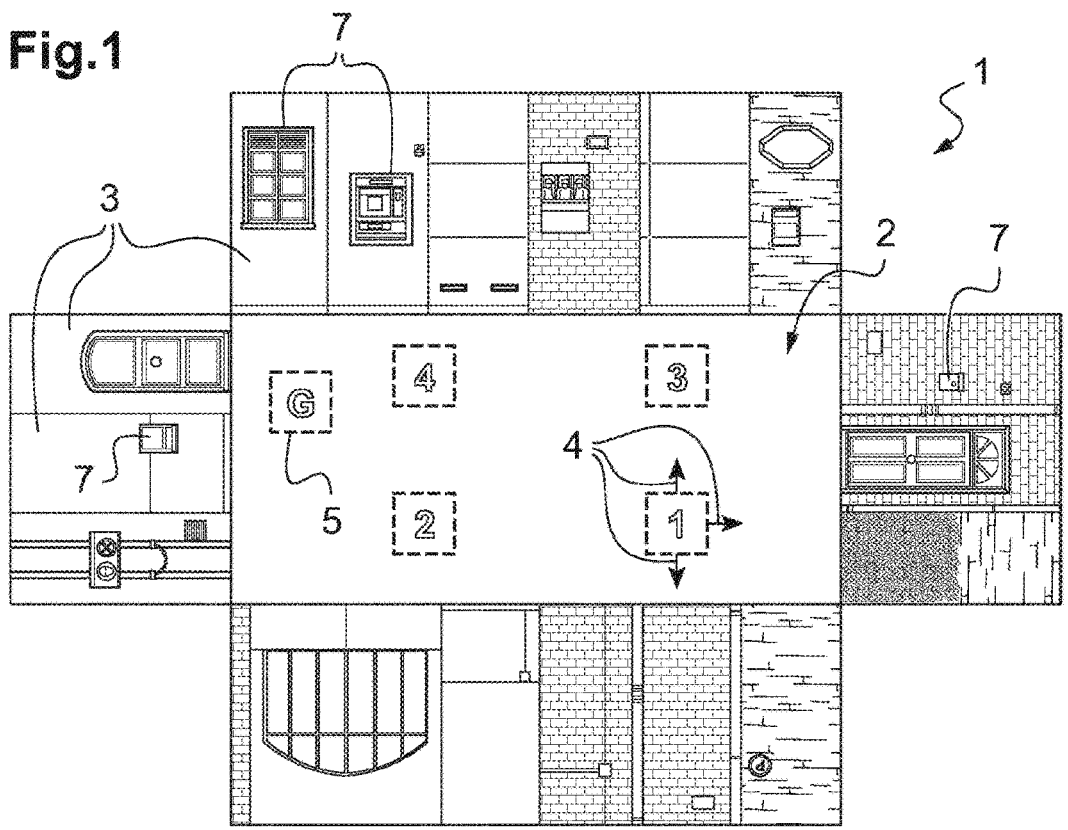
FIGS. 1 and 2 is a template-like view of the experimental platform used in order to determine the index of sensitivity of a subject.
Figure 2:
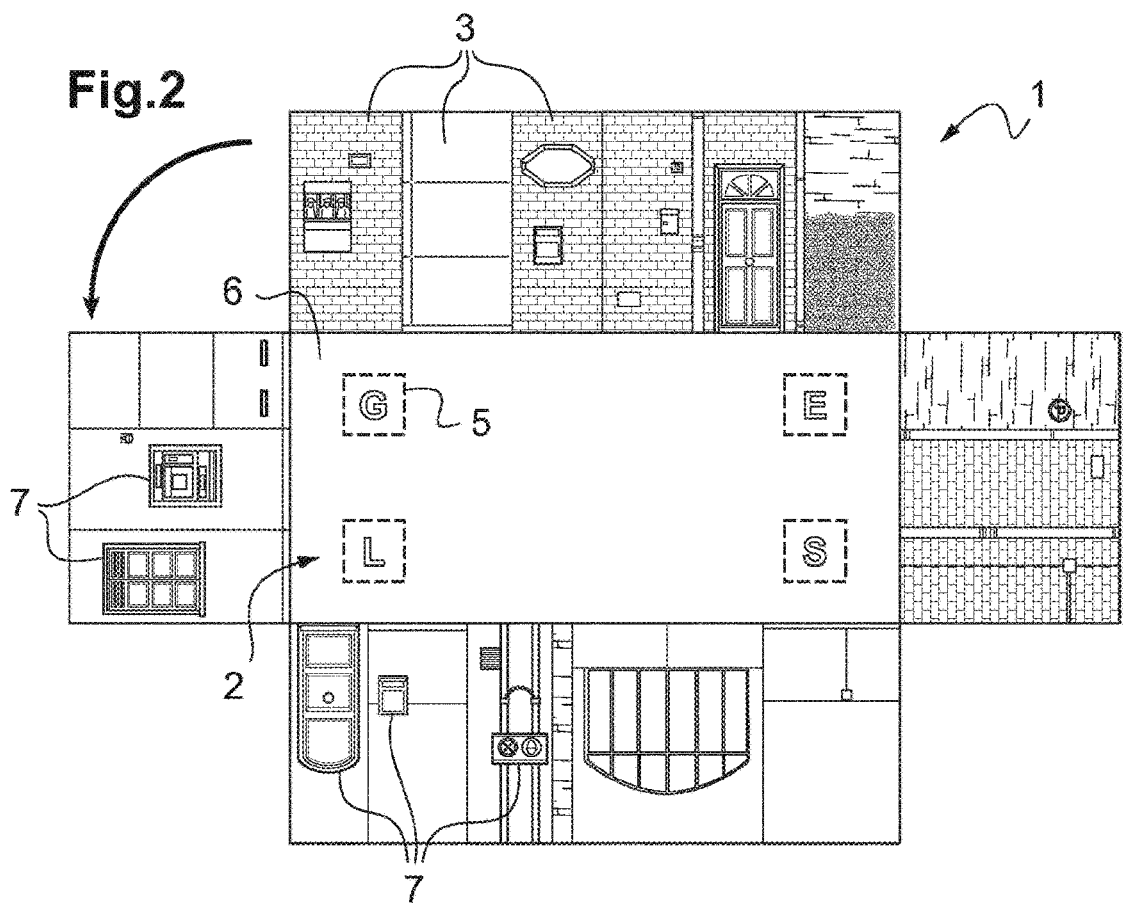

As presented on FIGS. 1 and 2, the present experiment is performed using a real platform 1 where the subject is placed in an actual environment which is a rectangular enclosure 2 (ca. 8.55 meters by 4.30 meters; aspect ratio=1.99) comprising panels 3 that cover the walls of the enclosure.

The panels 3 are 3 meters high and have a varying width. They resemble real world wall textures and imitate street-like relief sceneries such as brick walls, doors and windows (see FIGS. 1 and 2).

The ground of the room is covered by one evenly black linoleum. Light and sound conditions are controlled in the room: an evenly illumination (around 200 lux) and street-like multi-source sounds are played during the whole experiment in order to increase immersion in the actual environment.

Body kinematics of the subject are recorded by an opto-electronic motion capture system (10 infra-red cameras, model T160) at a 120 Hz sampling frequency (VICON Motion Systems Inc., Oxford, UK). Cameras (not shown) are positioned all around to cover the full volume of the room and placed in a symmetrical manner in the room. During the recording period, the subject wears a tight black suit with 39 infrared reflective markers, which follow the VICON Plug-In-Gait model.

In addition, ocular movements of the right eye of the subject are recorded by a video-based eye-tracker running at 60 Hz. The eye-tracker camera is mounted on light goggles that allow the subject to wear his own glasses (if needed) during the experiment.

A calibration procedure is done in order to compute the three dimensional vector of gaze in the framework of the room. This procedure includes computing the center of rotation of the eye relative to the four reflective markers positioned on the eye-tracker goggles. Then, correspondence between the eye position in the eye-tracker camera coordinate system and the room coordinate system is calculated thank to an ellipsoidal calibration grid composed of 25 markers. The grid is 145 cm wide and 100 cm high and is placed at eye level, approximately one meter away from the subject in order to cover the maximal range of eye orientation. Additionally, in order to correct for potential drift occurring over the experiment, a two-point drift correction is made before each trial.

Experimental Protocol

The task requires the subject to navigate as fast as possible in the environment formed by the platform described just above. The subject is asked to displace from an initial location towards an invisible goal in the room described in the former section.

The initial location and the goal have respective predetermined positions in a reference frame associated with the environment (i.e. with the platform). In the present example, the goal to reach is located in the northwest quadrant of the room and is 80×80 cm large (see dashed area "G" in FIGS. 1 and 2).

Learning Phase

At the beginning of the experiment, the subject is naive about the environment and the goal position. Importantly, the subject is disoriented before each trial. This procedure requires the subject to sit on a chair, eyes closed, while the experimenter slowly rotates and moves the chair in the whole room. To ensure that this procedure is truly disorientating, we ask the subject to point toward the starting point of the disorientation, keeping eyes closed.

The subject starts the trial in a pseudorandom manner from four positions as indicated by the dashed areas "1"-"4" in FIG. 1, and three orientations as showed in arrows 4 in FIG. 1 (starting orientation directly toward the goal is not considered).

As soon as the subject enters the goal zone 5, a rewarding signal sounds indicating to the subject that he reached the goal zone 5. The subject is then instructed to close the eyes and the trial is over.

Probe Phase

After a certain number of trials of learning, here 8 trials, the entire configuration of the panels 3 is rotated (see rotating arrow in FIG. 2) in order to put the landmarks 7 and the geometric information in conflict. As shown on FIG. 2, the local landmark features that were near the goal corner 6 during the learning phase are now positioned in the adjacent, geometrically different corner.

Therefore, with the geometrical transformation made to the environment of the subject, the positions of the local landmarks 7 in the reference frame associated with the environment are changed, but the global geometry of the environment and the position of the goal remain unchanged.

In another embodiment, a possible transformation on the environment may introduce an ambiguity on the global geometry of the environment, for instance by changing the aspect ratio of the room (making the room more or less square or rectangular). In this case, a subject relying more on global geometry of the environment will be impaired, whereas a subject relying more on the local landmarks may not be impacted. Another possibility would be to modify the appearance of the local landmarks, e. g. by fading the landmark features.

Five probe trials are done after transformation of the environment, trials during which the rewarding area stays the same (dashed area "G" on FIG. 2). The subject is not informed about the transformation procedure. He is then asked, in the transformed environment, to reach the goal starting from the same initial positions.

For one particular probe, the subject is either classified as "geometry" or as "landmark" depending on whether the subject relies on said global geometry or on said local landmarks 7 of the environment to navigate within the environment in order to reach the goal within the enclosure.

Subject's classification ("geometry" or "landmark") is defined by the path taken by the subject to reach the goal, that is by the trajectory employed by the subject during the first probe trial after the transformation of the environment (rotation of landmarks 7).

More precisely, if the subject first enters the goal ("G" on FIG. 2) or its symmetrical area ("S"), then he/she is assigned to the geometric group and the index of sensitivity of the subject is equal to "geometry". On the contrary, if the subject first enters the landmark area ("L"), then he/she is assigned to landmark group and the index of sensitivity of the subject is equal to "landmark". None of the subjects went to the error area ("E").

The paths taken by the subjects to reach the goal are obtained by calculating the center of mass of the four markers on the eye-tracker goggles. Oculomotor data are obtained by considering the intersection of the gaze vector in the reference frame of the environment (i.e. in the 3D model of the room).

Particularly, we are interested in ocular fixation, i.e. the period of time where visual information is best acquired by the subject. In order to detect ocular fixation, we calculate the gaze dispersion vector in the reference frame, which corresponds to the distance between two successive points, an estimate of eye velocity.

For each probe trial, a continuous period of time where gaze dispersion is below 2 SD from the median of the distribution is considered as a candidate fixation. Among those, ocular fixations with duration lower than 100 milliseconds are discarded.

Figure 3:
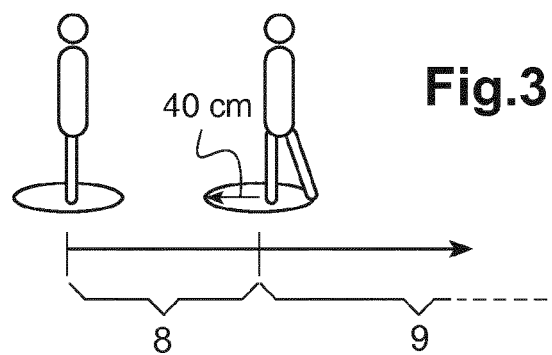
FIG. 3 is a schematic view of a subject in the orientation period and in the navigation period of the protocol to determine his/her index of sensitivity.

We further consider two distinct periods inside a trial. Specifically, as represented in FIG. 3, we identify the first part of the trial as an orientation period 8, which begins at eye opening until the subject starts walking (i.e. when the participant surpasses a virtual radius of 40 centimeters from the initial position). The subsequent navigation period 9 lasts until the subject enters one of the areas "G", "S", or "L" (see FIG. 2).

Results

Based on the trajectories produced during the learning phase (trial No. 1 to trial No. 8), we estimated the travelled distance in meters (that is the total length of the path taken by the subject) and walking speed (in meters per second). We also estimated the escape latency needed to reach the goal, that is the duration, in seconds, of both the orientation and navigation periods) as well as the orientation phase duration (duration in seconds of the orientation period only).

Finally, the "optimality" of the path of the subject was assessed by determining:
- the heading deviation: mean angular error of a subject's trajectory with respect to the goal location; and
- the path tortuosity: ratio between the length of subject's path and the shortest distance from initial position to goal location.

We present below the results of our experiment obtained for a cohort of 39 subjects:
- 20 "young" adults (11 females, 9 males) aged between 19 and 37 years old (avg.=26.25, std. dev.=4.97); and
- 19 "old" adults (10 females, 9 males) aged between 61 and 79 years old (avg.=71.21, std. dev.=4.35) participate in this study.

Results from the Learning Phase

We found that old subjects were as able as young ones to learn the task (i.e. parallel learning curves) that both groups seem to reach an asymptotic performance starting from the fourth trial.

Moreover, by averaging data over the 8 learning trials (see "learning phase" above), we found that older adults travelled a longer distance and had a less optimal trajectory in reaching the goal location: longer travelled distance, and higher path tortuosity.

Old adults were also significantly delayed in reaching the goal location. Interestingly, we additionally found that older adults had a significantly longer orientation period duration when compared to young adults.

Results from the Probe Phase (First Trial)

It has been found from the collected data that
- most (15 out of 20) of the young adults oriented during navigation based on the local landmark features; and
- the major part (12 out of 19) of the older subjects oriented during navigation according to the global geometry of the environment, thus neglecting the rotation of landmarks 7 (transformation of the environment).

Figure 4:
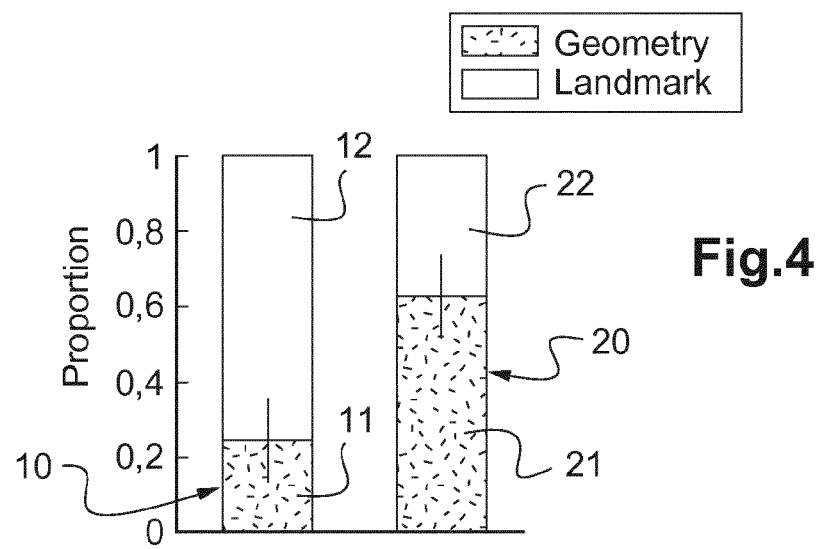
FIG. 4 represents bar diagrams for young and old adults of the proportion of subjects navigating according to the geometry or to the landmarks of the environment.

These preliminary results are represented in FIG. 4, where the proportion (between 0 and 1) of young (bar 10) and old (bar 20) subjects that oriented according to landmarks (bars 12, 22) and geometry (bars 11, 21) on the first probe trial is plotted (error bars show the 68% confidence interval).

From those results, we can assess that most young adults oriented according to landmarks whereas the most part of older adults oriented according to the geometry of the room.

In other words, implementing the above-detailed experiment allows determining an index of sensitivity for each of the subjects, this index indicating how or whether he/she relies on the global geometry of the environment and/or on the local landmark features present in the nearby surroundings of the environment.

Other Probe Trials (Trials 2 to 5)

With the other probe trials, it is possible to make a statistics on the navigation preferences of each subject and even determine the index of sensitivity in accordance with the probability of said subject to rely preferably on said global geometry or on said local landmarks.

For example, the index of sensitivity can range from 0 to 1, the value "0" corresponding to a subject that relies only on the global geometry of the environment; and the value "1" corresponding to a subject that relies only on the local landmarks of the environment.

It is also possible to study gaze dynamics and oculomotor behavior of a subject with the proposed experiment.

Advantageously, in some embodiments of the invention, the method of determination further comprises before the second determination step, a step for assessing at least one oculomotor parameter representative of the oculomotor behavior of the subject related to said index of sensitivity.

Preferably, this oculomotor parameter is one of the following:
- a fixation time at eye level;
- a fixation time at ground level;
- a ratio between one fixation time and the other;
- an angular distribution of gaze directions;
- a mean or median direction of gaze;
- a preferred direction of gaze;
- a vertical and/or horizontal stability in gaze directions;
- a vertical and/or horizontal exploration in gaze directions; or
- an ocular velocity.

Figure 5:
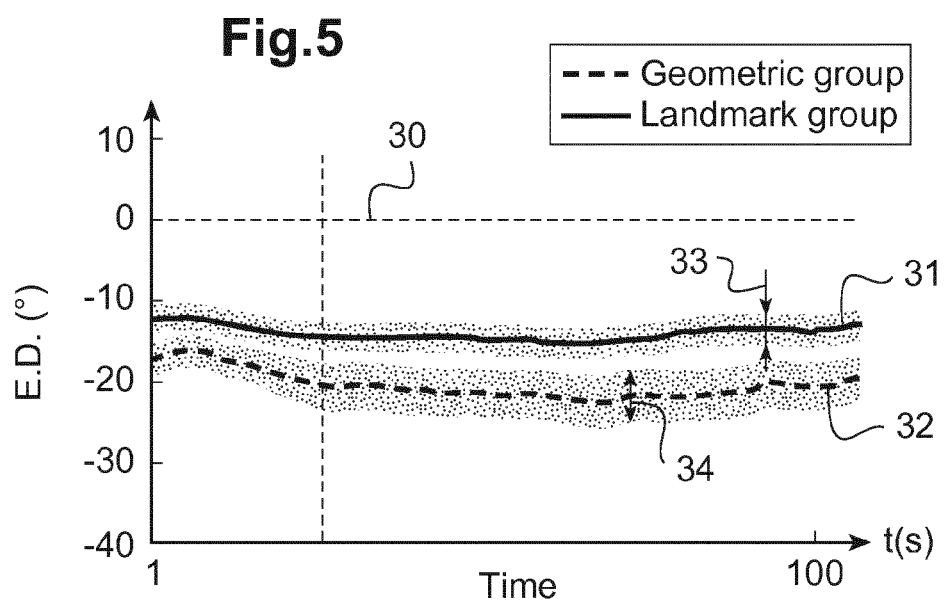
FIG. 5 shows the time evolution of the eye deviation (in degrees) relative to the head reference for the subjects in the "geometry" group and in the "landmarks" group.

For example, one has represented on FIG. 5 the eye deviation (noted ED and expressed in degrees) relative to the head level reference 30 (subject's gaze and head position while looking straight ahead at eye's height) as a function of time, during the orientation period 35 and the navigation period 36.

One has plotted on this FIG. 5 the respective curves 31, 32 both for the "landmarks" group (subjects relying on the local landmark features of the environment) and for the "geometry" group (subjects relying on the global geometry of the environment). Transparent areas 33, 34 correspond to standard deviation at a particular time step of the experiment.

It can be seen from those curves that subjects orienting during navigation according the global geometry of the environment direct their eyes lower in the head frame of reference than subjects orienting with landmarks. One may assume that this is linked to a need of the "geometry" group subjects to gaze at the ground rather than at the panels 3, where the local landmarks are.

Moreover, by analyzing eye movements spontaneously produced by the subjects while navigating, it has been found that the ground and the corners of the environment reproduced with the platform are of particular interest for the visual extraction of geometric cues As a conclusion, we described here a possible implementation of the first determination step of the method according to the invention, in order to determine an index of sensitivity for a subject indicating whether he/she relies during a navigation task more on the global geometry of the environment or more on the local landmark features of the environment.

It has been found that a subject navigating thanks to the geometry has, on average, a lower direction of gaze with respect to the head level, whereas a subject navigating thanks to the landmarks tends to present a higher direction of gaze (still lower than head level).

It is one aspect of the method of the invention to take into account this behavioral difference between subjects orienting after the geometry and subjects orienting by means of the landmarks and to determine an optical system intended to be worn by the subject based on this index of sensitivity.

Up to now, the above observed behavioral difference is not taken into account for example in the current conception of visual equipment of wearers. This may cause discomfort during navigation as well as blur or impair interesting, orienting cues for the subject.

Therefore, the index of sensitivity previously determined may be used to determine an optical system, such as an ophthalmic lens or an ophthalmic filter for example, which is designed to maintain or improve the visual performance of the subject during navigation.

And the oculomotor parameter can be advantageously used in order to take into account the gaze dynamics for subjects relying more on geometry or more on landmarks.

We will thus describe two different applications of the determination of the above detailed index of sensitivity of the subject.

The first example relates to the optical design of an ophthalmic lens and the second example relates to the determination of an ophthalmic filter to be used for navigation.

Optical Design of an Ophthalmic Lens

As explained above, the index of sensitivity of a subject reveals to the extent of which this subject relies on the global geometry of the environment or on the local landmarks of the environment to navigate within this environment. Further, it has been demonstrated that a subject, having an index of sensitivity showing that he/she relies on geometry of the environment to orient himself/herself while navigating in the environment (subject belonging to the "geometry" group), presented an angular distribution of directions of gaze that is prominently asymmetric, the subject having the tendency to keep his/her line of sight directed to the ground.

On the contrary, for a subject having an index of sensitivity showing that he/she relies on the landmarks of the environment to orient himself/herself while navigating in the environment (subject belonging to the "landmarks" group), it has been found that this subject had a preferred direction of gaze at head level and a more stable line of sight in this direction.

We will now explain how one can determine the ophthalmic lens as a function of said index of sensitivity.

More precisely, we will detail two solutions involving the optical designs of two specific progressive addition lens (PAL) designs.

Basically, an ophthalmic lens has generally an upper part and a lower part. In the upper part lies the far vision (FV) circle and far vision point reference point corresponding to a direction of gaze where the subject sees over long distances. And, in the lower part, lies the near vision (NV) corresponding to a lower direction of gaze where the subject sees over short distances, when he is reading for example. Between the two circles is an intermediate region ("progressive corridor") for intermediate vision, wherein the optical power increases (addition) from the FV point to the NV point.

Preferably, depending on the index of sensitivity determined previously and eventually also as a function of one or more oculomotor parameters related to this index of sensitivity, we can determine the optical system, here the ophthalmic lens, by performing at least one of the following operations:
- decreasing a characteristic value of the optical distortion in the lower part of the ophthalmic lens;
- decreasing the variation of the optical distortion along a substantially vertical axis;
- reducing the addition of the ophthalmic lens;
- increasing the size of an area in the upper part of the lens where a residual astigmatism is lower than 0.25 diopters; and/or
- widening the field of view for far vision conditions.

In the particular case described here, for the subject belonging to the "geometry" group, we can determine an ophthalmic lens (hereinafter referred to as "G lens"), for which the optical distortion in the vertical direction is reduced. Here, the idea is to preserve the layout, the perimeter of the environment for the subjects of this group.

Besides, for a "landmarks" subject, we can determine an ophthalmic lens (hereinafter referred to as "L lens") having a wider area free of astigmatism in the central part of the ophthalmic lens, around the far vision reference circle. Such ophthalmic lens thus offers a wider and clearer view at eye level.

Figure 6:
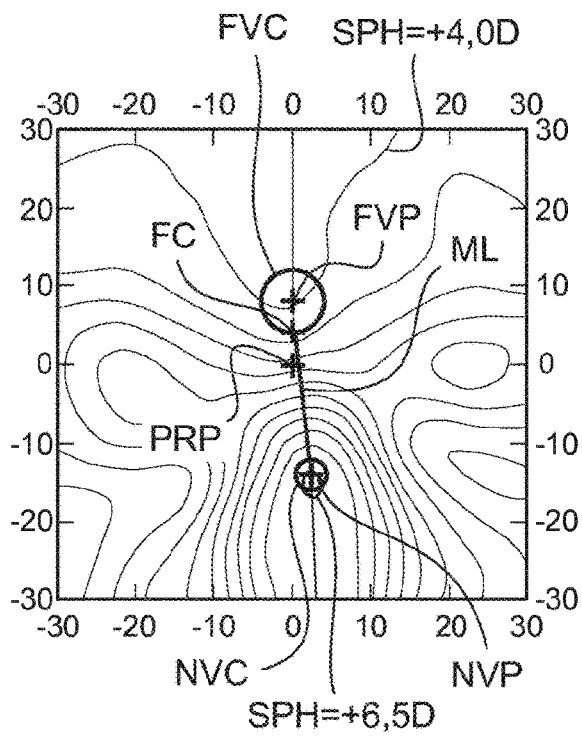
FIGS. 6 and 7 are 2D maps of the spherical power and of the residual astigmatism (both in diopters) for an ophthalmic lens ("G-lens") determined according to a method of the invention for a subject in the "geometry" group.
Figure 7:
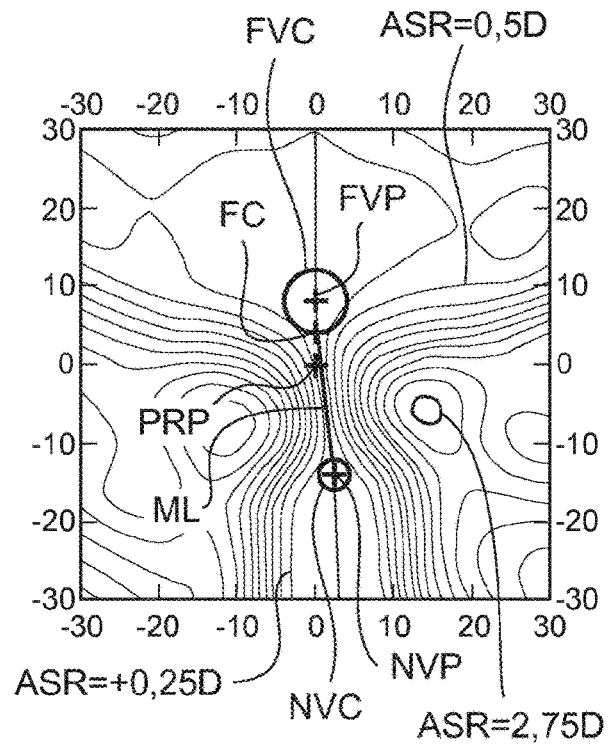
Figure 8:
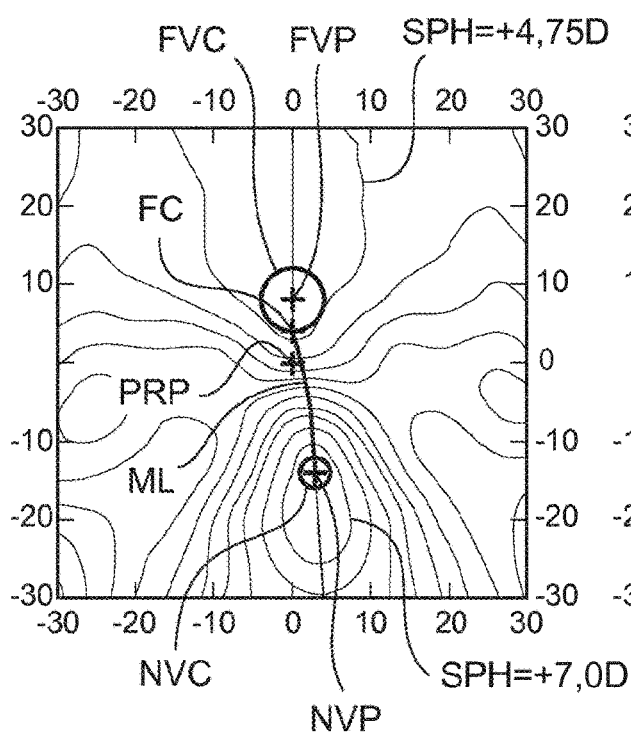
FIGS. 8 and 9 are 2D maps of the spherical power and of the residual astigmatism (both in diopters) for an ophthalmic lens ("L-lens") determined according to a method of the invention for a subject in the "landmarks" group.
Figure 9:
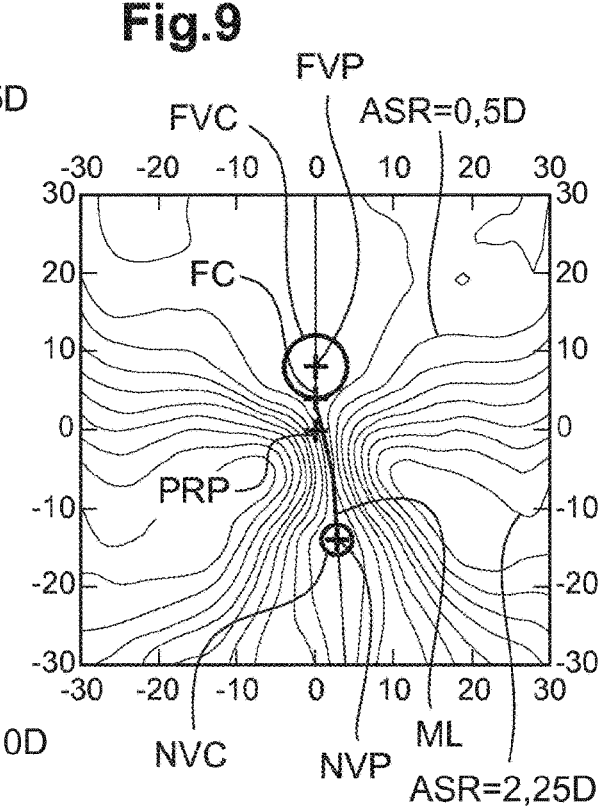

In order to illustrate these particular determinations, we represent two sets of figures (maps):

FIGS. 6 and 7: maps (60 mm×60 mm) of isolines of spherical power (SPH in diopters) and residual astigmatism (ASR in diopters) for the G lens (subject belonging to the "geometry" group); and FIGS. 8 and 9: maps (60 mm×60 mm) of isolines of spherical power (SPH in diopters) and residual astigmatism (ASR in diopters) for the L lens (subject belonging to the "landmarks" group).

On each of the FIGS. 6-9, the various references are the following:

FVC and FVP: far-vision circle (zone) and far-vision point;
PRP (center of the maps): prism reference point;
FC: fitting cross (+4 mm of height with respect to PRP);
ML: meridian line along the corridor of progression;
NVC and NVP: near-vision circle and near-vision point.

In all the maps of FIGS. 6-9, two adjacent isolines of optical power are separated by +/−0.25 D. On those figures, we plot some particular isolines by way of example.

Comparing the far vision zone of FIGS. 7 and 9, we see that the width at the fitting cross FC for the +0.5D isoline of ASR is 7 mm for the G lens and 11 mm for the L lens. Furthermore, still comparing ASR isolines of L- and G-lens, we see that the isolines are more open in the far vision area for the L-lens compared to the G-lens.

Advantageously, if at the first step of determination of the method according to the invention, the index of sensitivity shows that the subject has a variable behavior, meaning that he/she orients during navigation both according to the global geometry and to the local landmarks of the environment, then at the second step of the method, we can determine the ophthalmic lens as a combination of the two optical designs described above (G- and L-lens), e.g. by weighting the two designs in accordance with the probability of the subject to rely on geometry or on landmarks.

In a particular implementation of the method according to the invention, one can determine an ophthalmic lens for a subject presenting an index of sensitivity indicating that he/she relies on the global geometry of the environment, as a lens that minimizes the optical distortion in the vertical direction in the lower part of the ophthalmic lens. Thus, the determined ophthalmic lens preserves at best the horizontal lines of the layout.

By way of examples, we plot on FIGS. 10 and 11 the images of a regular grid with the deviation map of the G-lens (FIG. 10) and the L-lens (FIG. 11). The idea here is to compare the optical distortion in the vertical direction in the lower part of the lens for both lenses.

The region of interest is indicated in a denser mesh, from 20° nasal to edge temporal, and −5° upper to −30° lower limits in this example. The 0° reference angle corresponds to the fitting cross of the lens. It also correspond to the gaze height through the lens when subject looks straight ahead in head level reference We defined $\Delta Y$ as the vertical height (in degrees) of a distorted line in a specific region of interest. $\Delta Y$ is the peak-to-valley distance of the distorted line to a horizontal straight line (in dash line on FIGS. 10-11). $\Delta Y$ is calculated according to the height of gaze through the lens (vertical axis above) for both G- and L-lens. The results are presented on FIG. 12 for both lenses.

We also represented in FIG. 12, the ratio of $\Delta Y$ between G-lens and L-lens. The particular values on the graph of FIG. 12 are for a lowering of the gaze direction of 22°: a ratio of 0.84 is equivalent to a gain of 16%.

Optical Design of an Ophthalmic Filter

Like for the determination of the ophthalmic lens described above, it is possible and often advantageous to take into account the index of sensitivity of a subject to the environment in order to recommend a good or better ophthalmic filter.

As explained, this index of sensitivity of a subject informs about the way a subject perceives his/her environment and how he/she relies on the global geometry of the environment or on the local landmarks of the environment to navigate within this environment.

It has been found thanks to the experimental protocol presented beforehand that subjects orienting according to the global geometry of the environment direct their eyes lower in the head frame of reference than the subjects orienting according to the local landmark features.

In high light level conditions (glare condition for example), subject usually wear sunglasses. Nevertheless, wearing too dark lenses can reduce visual performance such as visual acuity, contrast sensitivity, depth perception, visual field, or attentional field used to extract geometric cues.

In order to improve or maintain the visual performance of a subject in the "geometry" group, one can adapt the optical properties of the ophthalmic filter.

Basically, one can envision four different approaches for this adaptation of the optical properties:

$1^{st}$ approach: specific spectral response over the whole surface of the lens in accordance with the "geometry" or "landmark" profile of the subject;

$2^{nd}$ approach: specific spectral response of the upper part versus the lower part of the lens according to the "geometry" or "landmark" profile of the subject;

$3^{rd}$ approach: specific luminous transmission (Tv) over the whole lens as a function of the "geometry" or "landmark" profile of the subject (e.g. one class lower or much higher Tv for a "G" profile);

$4^{th}$ approach: depending on the "geometry" or the "landmark" profile of the subject, a gradient of luminous transmission or a two-colors tint of the lens.

In some embodiments, the second step of determination of the method includes a sub-step wherein one imparts, as a function of the index of sensitivity determined previously for the subject, a first spectral response to an upper part of the ophthalmic filter and a second spectral response to a lower part of the ophthalmic filter.

In other embodiments, one can impart a substantially vertical gradient of luminous transmission between the upper part and the lower part of the ophthalmic filter.

For example, for a subject belonging to the "geometry" group (see above), one can adapt the transmission properties of the ophthalmic filter in its lower part, e.g. a lower luminous transmission, a lower darkness level, and/or a different spectral transmission (e.g. letting the yellow wavelengths pass through the filter to reinforce vision performance).

One example of an optical design of an ophthalmic filter 40 is represented on FIG. 13. On this particular filter 40, the upper part 41 is darker than the lower part 42 of the ophthalmic filter 40. The gradient applied to the filter 40 allows reducing the luminous transmission $T_v$ in the lower part 42 of the lens. Vision is therefore not penalized by a too dark lens in the interest area of the filter 40 (as a subject of the "geometry" group tends to have a lower direction of gaze). Hence, it helps the subject analyzing the geometric cues of the environment without too annoying perturbation. Depth perception, contrast sensitivity, and visual acuity are preserved.

In other particular embodiments, one can determine, as a function of the index of sensitivity, the ophthalmic filter 40 as having a specific spectral response, e.g. a particular spectral transmission in the lower part 42 of the filter 40 to enhance the contrast sensitivity, depth perception, visual field, etc., which are favorable to extract geometric cues. The specific tint, e.g. yellow, orange, or green, can be applied only in the lower part 42 or on the entire gradient filter 40.

In other embodiments, one can determine the ophthalmic filter as having a well-suited spectral response and/or luminous transmission over the entire lens (no clear partition between the upper and lower parts of the lens) depending on whether the subject relies more on "geometry" or on "landmarks". For instance, one can choose a yellow spectrum for a subject in the "G" group because it allows enhancing the contrasts.

In alternative embodiments, one can propose an ophthalmic filter having a bifocal tint which is adapted to two distinct areas of the filter: a dark filter (with a first value of luminous transmission) for the far-vision area, and a clear filter (with a second value of luminous transmission) for the intermediate and/or near-vision area. Hence, the filter presents two values of luminous transmission $T_v$ rather than a progressive gradient of luminous transmission.

As a variant, one may apply a specific pattern of luminous transmission and/or spectral response to force the subject directing his/her gaze to a particular zone of the filter, therefore stimulating the gaze of the subject to a specific direction of gaze which is better for his/her profile: to the ground for a subject in the "geometry" group and to the eye level for a subject in the "landmarks" group.

A specific protocol may be performed to determine the set of luminous transmission values and/or spectral response values in accordance with the subject's index of sensitivity. Such protocol is described in International application published under No. WO 2016/0113506.

In the above-detailed description of the preferred embodiment, the step of determination of the index of sensitivity is performed by using a specific experimental setup and protocol, namely the room with the geometric and landmark features wherein one tries to assess what is the navigation preferences of the subject, that is to what extent he may be considered as a subject in the "geometry" group ("G" group) or as a subject in the "landmark" group ("L" group).

Nevertheless, there exist alternative ways to reveal whether the subject is in the "L" or "G" group.

In a first alternative embodiment, one may present to the subject a type of image which is:

A) an "ecological" scene of a given environment (street, crossing, etc. . . . ) which is representative of an every day life: this may be a single image (e.g. picture) or a series of everyday images; or B) an abstract image of a meaningless pattern representing a progress pattern, like those used in the Group Embedded Figures Test (GEFT), the Trail Making Test (TMT), or the Perspective-Taking/Spatial Orientation test (PTSO: see M. Hegarty and D. Waller, "A dissociation between mental rotation and perspective-taking spatial abilities". Intelligence, Vol. 32, Iss. 2, pp. 175-191, 2004, DOI: http://doi.org/10.1016/j.intell.2003.12.001).

These tests (GEFT, TMT, PTSO) assess cognitive functions that can be correlated to the extent in which the subject is using geometric or landmark information. For instance, the GEFT measures the ability of the subject to identify simple figures inside a complex scene. The TMT is indicative of the mental flexibility with which the subject can alternate quickly between sequences of letters and numbers. And the PTSO measures the ability of the subject to perform mental rotations and imagine directions in relation to an array of objects.

Other cognitive tests could be included; this is not restricted to these 3. For instance, short and long-term memory and/or working memory test such as Corsi block tapping test.

Then, the test performed by the subject is the following:
 a) memorizing a trajectory, a suite or a sequence;
 b) finding an object in the environment or in the series of images;
 c) transcripting or describing the scene or the pattern.

To estimate the profile of the subject, one may assess the needed time to perform the test and/or the relevance of the answer(s) given by the subject.

Gaze fixation pattern during scene viewing can also be analyzed in order to see if the subject focuses on landmark cues or on geometric cues.

The complexity of the task(s) may be varied throughout the test (e.g. increase of complexity based on subject's memorizing ability, such as in the "Simon says . . . " game).

The content of the test may be modified by:
 i) reducing the quantity, the variability or the visibility of the local "landmark" features in the scene or series of images;
 ii) reducing asymmetries (i.e. adding ambiguities) or simplifying the global "geometric" features (adding curve lines, alignment errors);
 iii) moving local patterns in the global environment in order to introduce a conflict between the presentation of the sequence and the answer of the subject (like, e.g., in the "Simon says . . . " game where the colors move);
 iv) integrating an animation or a movement in the scene (video) instead of a static environment (static image);
 v) modulating the field of view of the subject to adjust the amount of visible geometrical information;
 vi) modulating the likelihood of the displacement with realistic optic flow including bounce and sway of the head while walking.

The test may be implemented by using real supports (such as the "Streetlab" platform), by using virtual supports (such as Virtual and/or Augmented Reality headsets), or by using digital supports, e.g. smartphones or numerical tablets.

Those different supports will allow the subject to navigate in different manner, involving a variable amount of motor action and sensory modalities. For instance, the subject can walk normally and feel his motion trough his full body, or use a joystick, a steering wheel, a keyboard and only see the displacement.

It is also possible to use a paper-based image of the scene and ask the subject to look for an object associated with the scene or describe said scene. The utilized/described cues and vocabulary used to locate the object (global vs. local cues, landmark vs. geometric cues, . . . ) are noticed.

In the case c) above, the subject reconstructs a reference scene where the subject is able to navigate, such as a street view, a landscape, the succession of halls of a museum, the maze of underground transport, draws this scene on a paper or digital support, or put into words what he/she sees in the scene. Local or global cues used for this task are noticed as well as the time to fulfil the task.

In a second alternative embodiment, a simple survey may be used to distinct those from the subjects who are more sensitive to the geometry or to the landmark.

The survey may focus on the habits allowing the subject to orient himself/herself during specific activities (driving, walking, etc. . . . ) or during his/her everyday journey. One may ask the subject if he/she is sensitive to the store fronts, to advertising displays, or if he/she has difficulties to orient himself/herself on a paper map.

In a third alternative embodiment, one may present to the subject a labyrinth either in a video game or in real life, wherein each path may lead to a goal. The labyrinth may be formed by couple of sub-paths wherein the subject is submitted to a choice between a first sub-path and a second sub-path and wherein the first sub-path may be associated to a geometrical cue and the second sub-path may be associated to a landmark cue. The path is therefore a result of choices as a ratio of sub-paths belonging to the L-group and to the G-group.

It is also possible to navigate in a space more or less open (not a maze or arena with vertical wall) where the geometry is explicit. It can be materialized by lines, aligned beacons, tracks, roads, rivers (as on a game board, in a sport ground, around port or airport). Landmarks can be any object placed in the environment.

In a more general manner, it is possible to assess the dependency to local cues and to global cues separately and calculate a ratio, or directly a ratio between global and local cues. These two approaches can be cumulated, and the obtained difference quantifies the robustness of the measurement. If the variability is too high, additional measurements may be required.

The invention claimed is:

1. A method for determining the design of an optical system intended to equip a subject, said method comprising the steps of:
   placing the subject in an environment,
   determining an index of sensitivity of the subject placed in the environment including:
      surfaces and/or borders forming globally a geometry of said environment; and
      landmarks associated with specific locations within said environment, wherein the index of sensitivity indicates whether said subject relies preferably on said global geometry or on said local landmarks of the environment to navigate within said environment; and
   determining said design of the optical system as a function of said index of sensitivity.

2. The method according to claim 1, wherein said index of sensitivity is determined in accordance with the probability of said subject to rely preferably on said global geometry or on said local landmarks.

3. The method according to claim 1, wherein the step of determination of the index of sensitivity includes the sub-steps of:
   placing said subject in conditions for learning to displace in said environment from an initial location towards a goal having respective predetermined positions in a reference frame associated with said environment;
   making a geometrical transformation to said environment adapted, in said reference frame, to change the positions of the local landmarks without changing neither the position of said goal nor the global geometry of the environment;
   asking the subject, placed in the transformed environment to reach the goal starting from the same initial position;
   determining, from the path taken by the subject to reach the goal, the index of sensitivity of the user.

4. The method according to claim 1, wherein,
   the surfaces and/or borders forming the global geometry of the environment are sized to present an apparent size greater than one tenth of the size of the environment; and
   the local landmarks are sized to present an apparent size smaller than one tenth of the environment.

5. The method according to claim 1, further comprising, before the step of determining said design of the optical system, a step for assessing at least one oculomotor parameter representative of an oculomotor behavior of said subject related to said index of sensitivity.

6. The method according to claim 1, wherein said at least one oculomotor parameter is:
   a fixation time at eye level;
   a fixation time at ground level;
   a ratio between the fixation time at eye level and the fixation time at ground level; or
   an angular distribution of gaze directions;
   a mean or median direction of gaze;
   a preferred direction of gaze;
   a vertical and/or horizontal stability in gaze directions;
   a vertical and/or horizontal exploration in gaze directions;
   an ocular velocity.

7. The method according to claim 1, wherein the optical system is an ophthalmic lens, the ophthalmic lens having an upper part and a lower part, wherein the determination step comprises at least one substep among the following:
   decreasing a characteristic value of the optical distortion in the lower part of said ophthalmic lens;
   decreasing the variation of the optical distortion along a substantially vertical axis;
   the ophthalmic lens being a progressive lens and reducing the addition or the inset of the ophthalmic lens;
   the ophthalmic lens having an area of residual astigmatism lower than 0.25 diopters in at least an upper part of the lens and increasing the size of the area in the upper part of the lens where the residual astigmatism is lower than 0.25 diopters; and/or
   the ophthalmic lens having at least correction for far vision and widening the field of view for far vision conditions.

8. The method according to claim 1, wherein the optical system is an ophthalmic filter, the ophthalmic filter having an upper part and a lower part, wherein the determination step comprises at least one substep among the following:
   imparting a first spectral response to said upper part of the filter or imparting a second spectral response to said lower part of the filter; and/or
   imparting a substantially vertical gradient of luminous transmission between the upper and the lower part of said filter.

9. The method according to claim 1, wherein the step of determination of the index of sensitivity includes the sub-steps of:

placing said subject in conditions to virtually or really displace in said environment from an initial location towards a goal having respective predetermined positions in a reference frame associated with said environment, wherein said subject may select between at least two displacements which are possible to reach the goal through a first sub-path or a second sub-path, the first sub-path and the second sub-path belonging to a couple of alternative sub-paths, the first sub-path being associated to a local landmark whereas the second sub-path is associated to the global geometry of the environment, determining, from the displacement selected by the subject, the index of sensitivity of the user.

10. The method according to claim 9, wherein the subject may select a displacement between a plurality of displacements, wherein each displacement is formed by a succession of sub-paths, each selected in a couple of sub-paths formed by a first sub-path and a second sub-path, wherein the first sub-path is associated to a local landmark whereas the second sub-path is associated to the global geometry of the environment.

11. Ophthalmic lens intended to equip a subject, said ophthalmic lens having an upper part and a lower part and the design of the ophthalmic lens being determined according to a method comprising the steps of:

placing the subject in an environment,
determining an index of sensitivity of the subject placed in the environment including:
  surfaces and/or borders forming globally a geometry of said environment; and
  landmarks associated with specific locations within said environment,
wherein the index of sensitivity indicates whether said subject relies preferably on said global geometry or on said local landmarks of the environment to navigate within said environment; and
  determining said design of said ophthalmic lens as a function of said index of sensitivity, this step of determination including at least one substep among the following:
    decreasing a characteristic value of the optical distortion in the lower part of said ophthalmic lens;
    decreasing the variation of the optical distortion along a substantially vertical axis;
    the ophthalmic lens being a progressive lens and reducing the addition or the inset of the ophthalmic lens; and/or
    the ophthalmic lens having an area of residual astigmatism lower than 0.25 diopters in at least an upper part of the lens and increasing the size of the area in the upper part of the lens where the residual astigmatism is lower than 0.25 diopters.

12. Ophthalmic filter intended to equip a subject, said ophthalmic filter having an upper part and a lower part, the design of the ophthalmic filter being determined according to a method comprising the steps of:

placing the subject in an environment,
determining an index of sensitivity of the subject placed in the environment including:
  surfaces and/or borders forming globally a geometry of said environment; and
  landmarks associated with specific locations within said environment, how said subject relies on said global geometry and/or on said local landmarks of the environment to navigate within said environment; and
determining said design of said ophthalmic filter as a function of said index of sensitivity, this step of determination including at least one substep among the following:
  imparting a first spectral response to said upper part of the filter or imparting a second spectral response to said lower part of the filter; and/or
  imparting a substantially vertical gradient of luminous transmission between the upper and the lower part of said filter.

13. The method according to claim 2, wherein the step of determination of the index of sensitivity includes the substeps of:

placing said subject in conditions for learning to displace in said environment from an initial location towards a goal having respective predetermined positions in a reference frame associated with said environment;
making a geometrical transformation to said environment adapted, in said reference frame, to change the positions of the local landmarks without changing neither the position of said goal nor the global geometry of the environment;
asking the subject, placed in the transformed environment to reach the goal starting from the same initial position;
determining, from the path taken by the subject to reach the goal, the index of sensitivity of the user.

14. The method according to claim 2, wherein,
the surfaces and/or borders forming the global geometry of the environment are sized to present an apparent size greater than one tenth of the size of the environment; and
the local landmarks are sized to present an apparent size smaller than one tenth of the environment.

15. The method according to claim 3, wherein,
the surfaces and/or borders forming the global geometry of the environment are sized to present an apparent size greater than one tenth of the size of the environment; and
the local landmarks are sized to present an apparent size smaller than one tenth of the environment.

16. The method according to claim 2, further comprising, before the step of determining said design of the optical system, a step for assessing at least one oculomotor parameter representative of an oculomotor behavior of said subject related to said index of sensitivity.

* * * * *